(12) United States Patent
Ladouceur et al.

(10) Patent No.: US 7,651,401 B2
(45) Date of Patent: Jan. 26, 2010

(54) SELF-ATTACHING FEMALE FASTENER ELEMENTS AND METHOD OF FORMING SAME

(75) Inventors: Harold A. Ladouceur, Livonia, MI (US); John M. Parker, Ann Arbor, MI (US)

(73) Assignee: Whitesell International Corporation, Taylor, MI (US)

( * ) Notice: Subject to any disclaimer, the term of this patent is extended or adjusted under 35 U.S.C. 154(b) by 192 days.

(21) Appl. No.: 10/546,412

(22) PCT Filed: Nov. 24, 2003

(86) PCT No.: PCT/US03/37525

§ 371 (c)(1),
(2), (4) Date: Jul. 7, 2006

(87) PCT Pub. No.: WO2004/050269

PCT Pub. Date: Jun. 17, 2004

(65) Prior Publication Data

US 2006/0252560 A1    Nov. 9, 2006

(51) Int. Cl.
*B21D 53/24* (2006.01)
*B21H 3/08* (2006.01)
(52) U.S. Cl. .............................. 470/25; 470/21; 72/191
(58) Field of Classification Search .................. 470/18, 470/20, 21, 22, 25, 87, 96, 107, 108, 109; 72/184, 190, 191, 192, 194, 197, 203, 206, 72/404, 405.01
See application file for complete search history.

(56) References Cited

U.S. PATENT DOCUMENTS

| | | | | |
|---|---|---|---|---|
| 833,188 A | * | 10/1906 | Ward ........................... | 470/25 |
| 1,753,597 A | * | 4/1930 | Burns .......................... | 470/19 |
| 1,848,835 A | * | 3/1932 | Peirce ......................... | 470/21 |
| 1,982,054 A | * | 11/1934 | Hogue ......................... | 470/18 |
| 2,073,467 A | * | 3/1937 | Demboski et al. ............. | 470/21 |
| 2,320,651 A | * | 6/1943 | Poux ........................... | 72/187 |
| 3,711,931 A | | 1/1973 | Ladouceur et al. | |
| 3,775,791 A | | 12/1973 | Grube | |
| 3,793,658 A | * | 2/1974 | Ladouceur ................... | 470/21 |
| 3,909,927 A | | 10/1975 | Steward | |
| 4,690,599 A | | 9/1987 | Shinjo | |
| 4,971,499 A | * | 11/1990 | Ladouceur .................. | 411/179 |

(Continued)

FOREIGN PATENT DOCUMENTS

WO    WO 01/72449 A2    10/2001

OTHER PUBLICATIONS

PCT/US03/37525 International Search Report dated May 27, 2004.

*Primary Examiner*—Edward Tolan

(57) ABSTRACT

The method of forming self-attaching female fasteners by rolling a continuous metal strip including a central pilot portion having parallel sides and flange portions on opposed sides, severing at least the pilot portion and cold forming the rectangular pilot portion into a cylindrical end portion. Wing-shaped radial portions are formed in the pilot portion which may be severed or remain for anti-rotation features. The strip may remain continuous, wherein the severed pilot portions are spread and the flange portions are thinned or the strip may be severed into discrete fasteners. The female fasteners thus include generally cylindrical pilot portions and rectangular flange portions which may include rolled grooves.

13 Claims, 6 Drawing Sheets

U.S. PATENT DOCUMENTS

| | | |
|---|---|---|
| 5,531,552 A | 7/1996 | Takahashi et al. |
| 5,549,430 A | 8/1996 | Takahashi et al. |
| 6,439,819 B2 | 8/2002 | Swanstrom et al. |
| 7,011,584 B2 * | 3/2006 | Ward et al. .................... 470/25 |

* cited by examiner

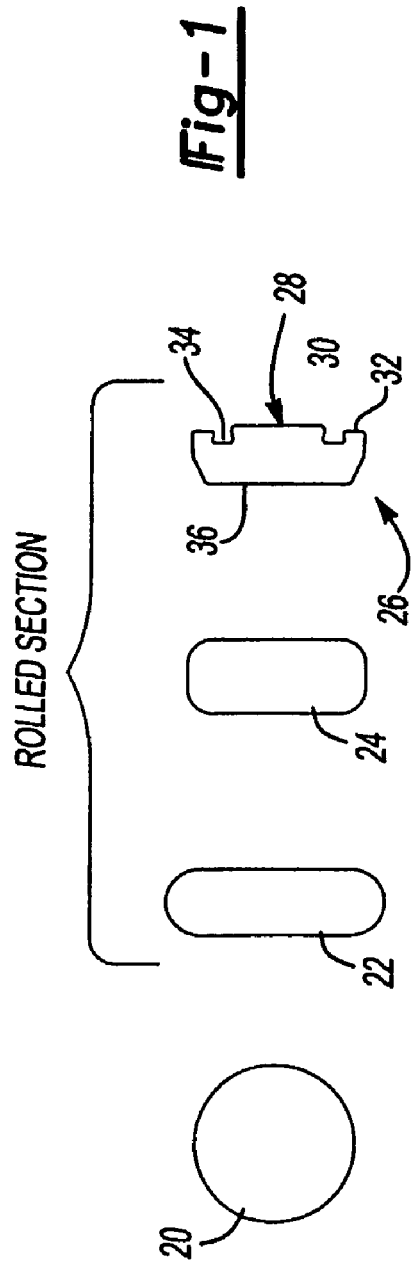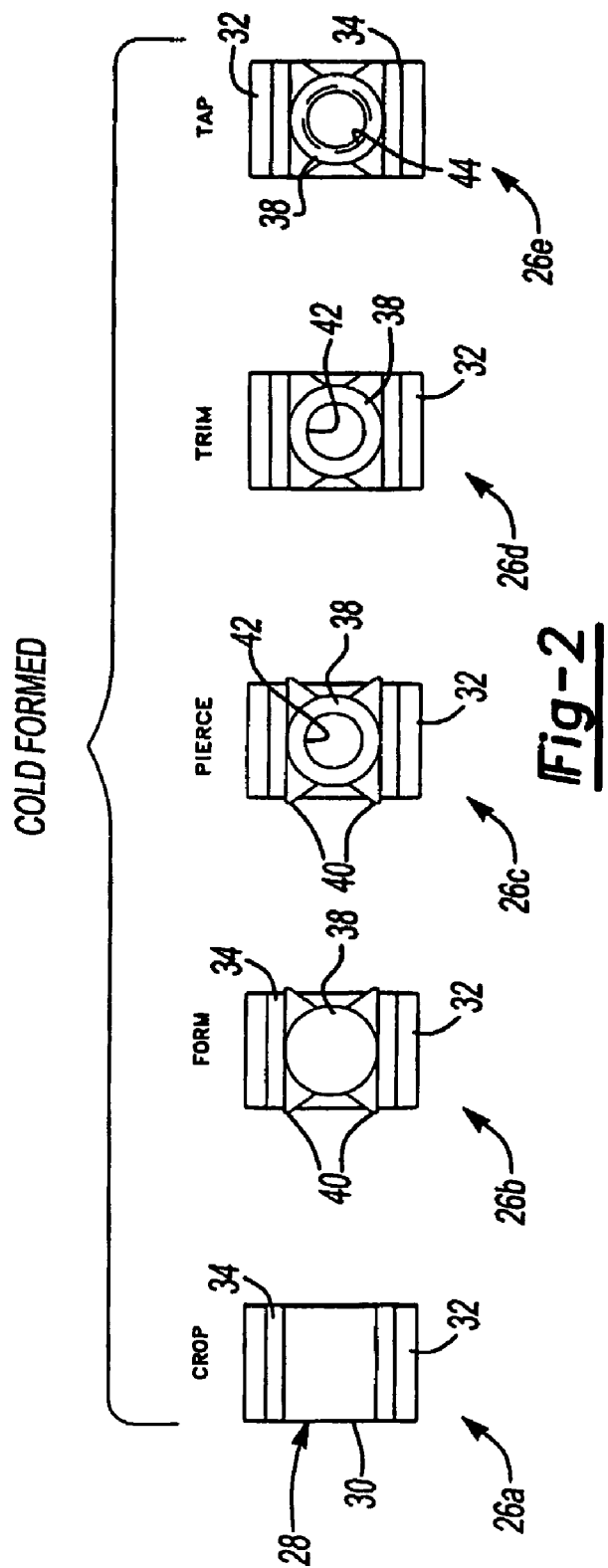

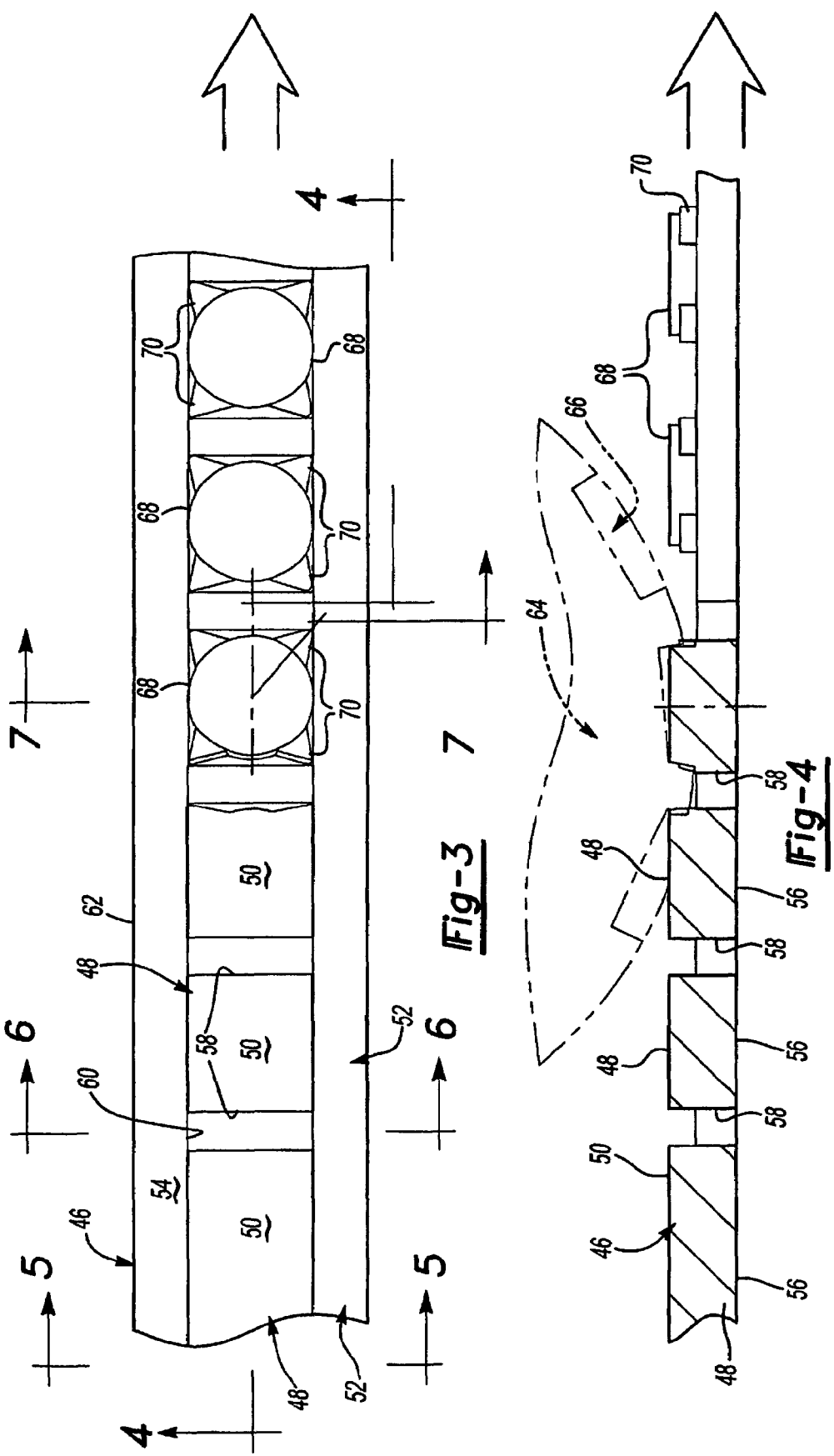

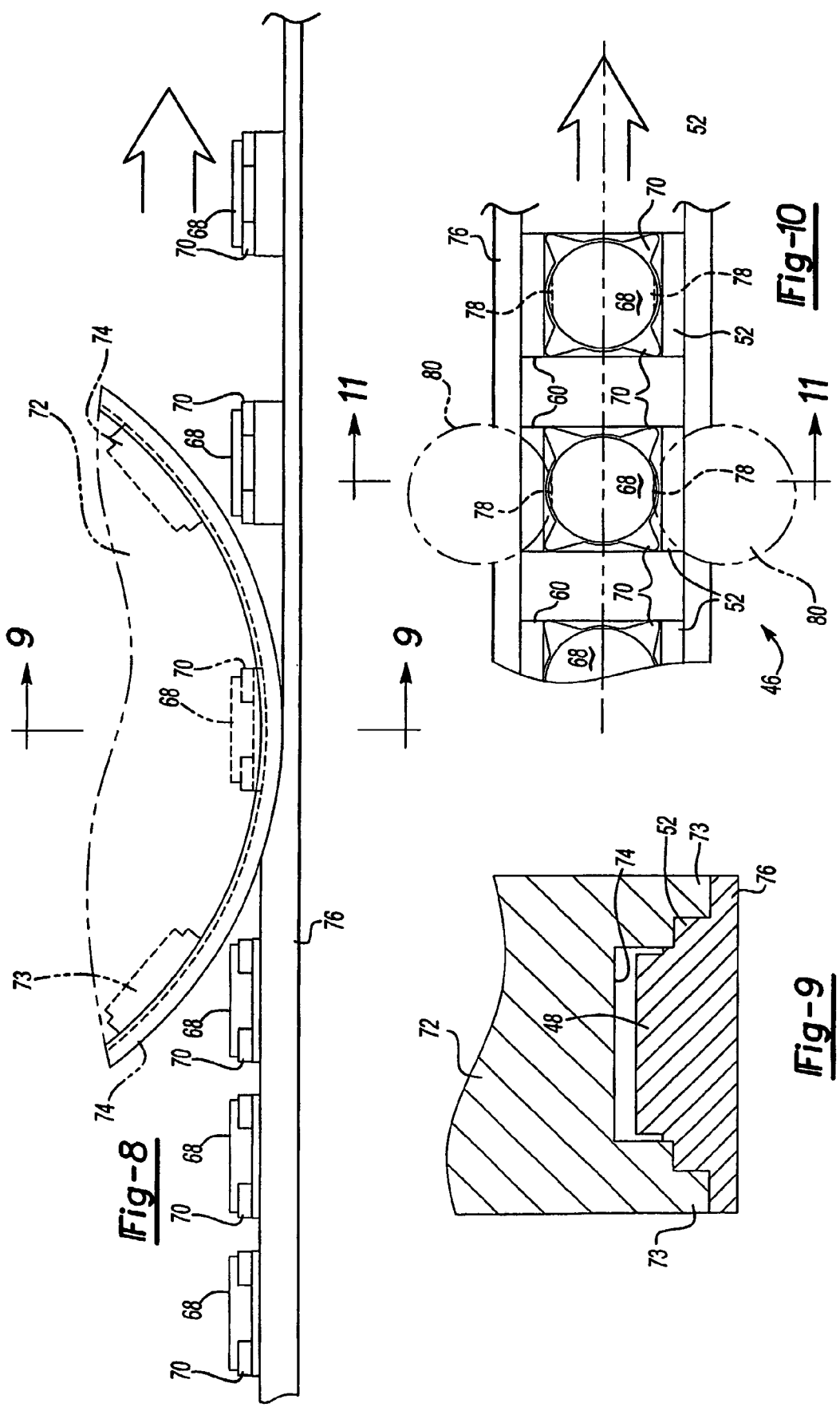

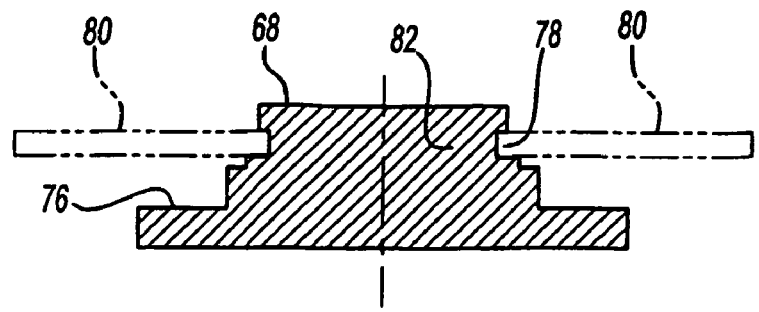
*Fig-11*
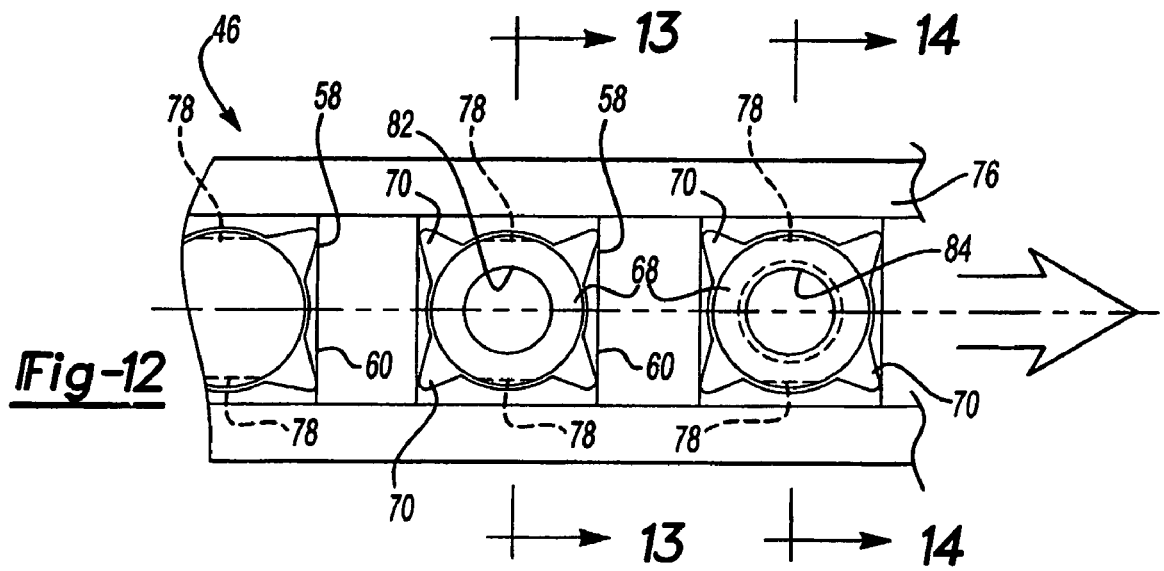
*Fig-12*
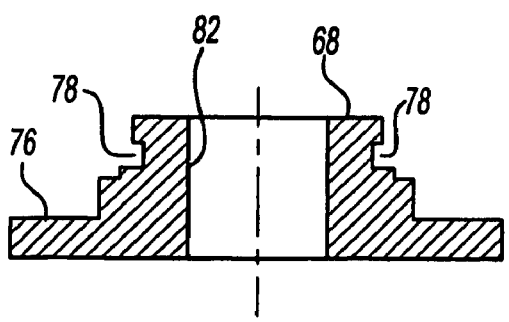　　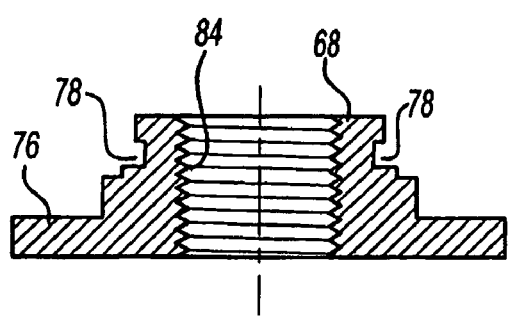
*Fig-13*　　*Fig-14*

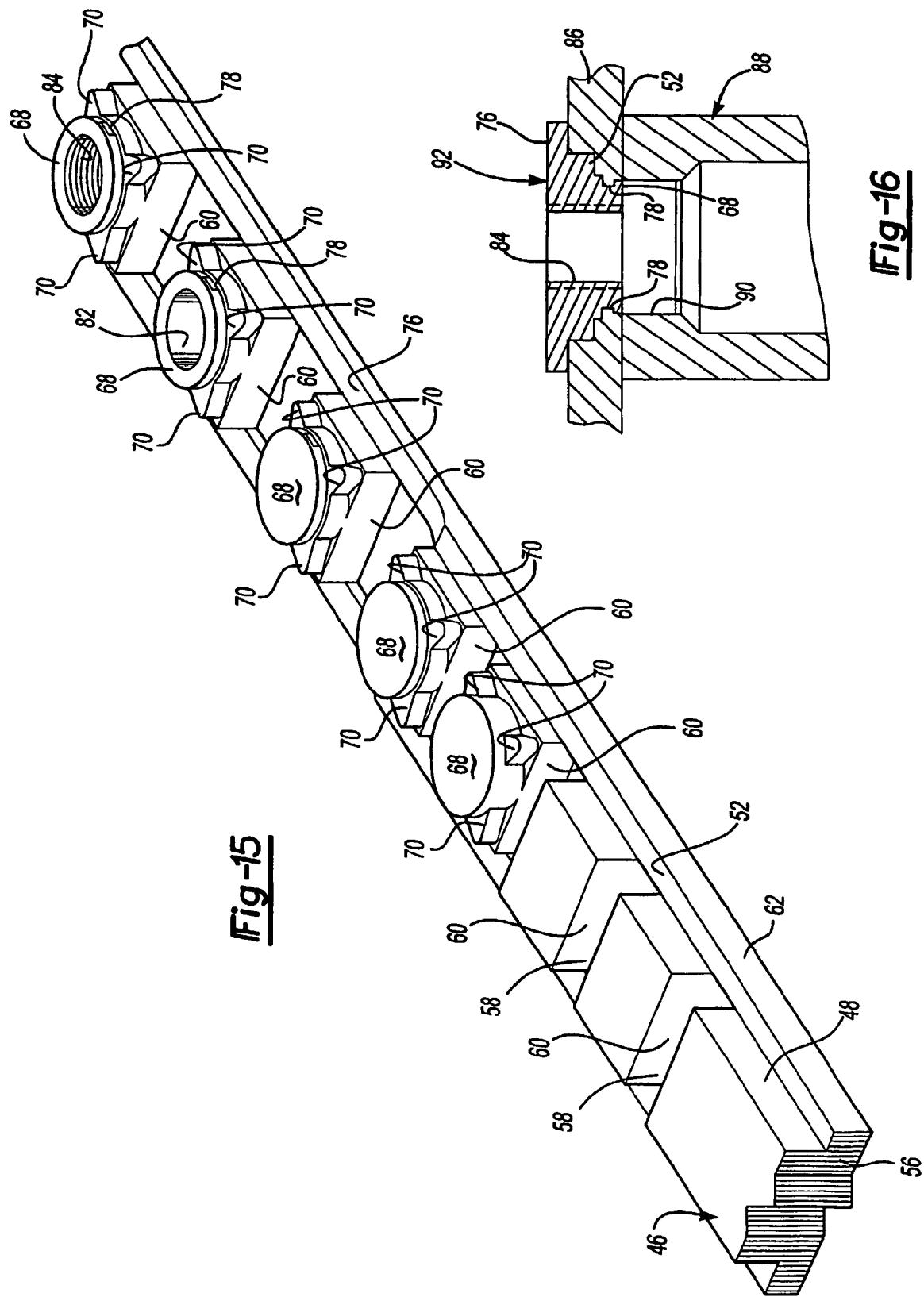

SELF-ATTACHING FEMALE FASTENER ELEMENTS AND METHOD OF FORMING SAME

This application is a 35 USC 371 of PCT/US03/37525, filed Nov. 24, 2003.

FIELD OF THE INVENTION

The present invention relates to self-attaching female fasteners and a method of forming female fastener elements utilizing a combination of rolling and cold header techniques to form an improved fastener element having a rectangular body portion and an integral central projecting pilot portion having a generally cylindrical end portion.

BACKGROUND OF THE INVENTION

Self-attaching fasteners, including pierce and clinch nuts as disclosed in U.S. Pat. Nos. 2,707,322 and 3,648,747, assigned to the predecessor in interest of the assignee of this application, have been commercially successful in mass production applications, such as utilized by the automotive and appliance industries. The self-attaching female fastener elements disclosed in these patents are formed by rolling techniques including rolling a continuous strip of metal having the desired cross-section of the female fastener element including a rectangular central pilot portion and flange portions on opposed sides of the pilot portion. The pilot portion is then pierced through the end face, forming a bore of the fastener element, and the strip is then cut or chopped to length and the bore may then be internally threaded, as required. Reference is also made to U.S. Pat. Nos. 3,775,795 and 3,999,659, which disclose a method of forming a continuous strip of female fastener elements of the type disclosed in the above-referenced U.S. Pat. No. 2,707,322, wherein the rolled strip is only partially severed by transverse slots punched through the continuous pilot portion and a portion of the flanges, such that the strip may be severed in the installation head during installation of the female fastener elements in a panel.

As will be understood by those skilled in this art, the pilot portion formed by rolling a continuous strip must include a rectangular pilot portion having a rectangular end face. The rectangular end face of the self-attaching fastener is then utilized to pierce a rectangular opening in a panel and the pilot portion is then received through the pierced panel opening and attached to the panel by a die member or die button, as described below. Alternatively, the rectangular pilot portion is received through a preformed rectangular opening in the panel where the self-attaching fastener element is utilized as a clinch nut.

Self-attaching fastener elements of the type disclosed in the above-referenced patents are typically attached in a panel in a die press, wherein the upper die shoe or die platen includes an installation head, which receives the self-attaching fasteners and having a reciprocating plunger, and the lower die shoe or die platen includes a die member or die button which supports the panel during installation and installs the nut in the panel with each stroke of the die press. Because the panel may be simultaneously formed during installation of the self-attaching female fastener element, this method of installation is preferred in mass production applications. However, there are certain applications where a generally round or cylindrical pilot portion is preferred to avoid stress risers at the sharp corners of the rectangular panel opening. However, pierce or clinch nuts having a generally cylindrical or circular pilot portion are presently manufactured only by conventional cold forming or cold heading techniques. It would, however, be desirable to form self-attaching female fastener elements by continuously rolling a metal wire, thereby utilizing the advantages of this technology, but resulting in a self-attaching female fastener having a generally circular or cylindrical pilot portion, thereby achieving one of the advantages of a female fastener element formed by conventional cold heading techniques, including the elimination of stress risers. Further, self-attaching fasteners formed by cold forming are more expensive. The method of forming self-attaching female fastener elements of this invention achieves these advantages and the resultant female fastener element has advantages over the prior art as now described.

SUMMARY OF THE INVENTION

The method of forming self-attaching female fasteners of this invention begins with rolling a continuous metal strip from a wire having a cross-section of the self-attaching fasteners to be formed including a continuous projecting pilot portion having an end face and continuous flange portions on opposed sides of the pilot portion. The method of this invention then includes severing at least the continuous pilot portion thereby forming spaced generally rectangular pilot portions. In one method of forming self-attaching female fastener elements of this invention, the method includes severing the strip through the pilot and flange portions, thereby forming discrete fastener segments each having rectangular pilot portions and flange portions on opposed sides of the pilot portions. In an alternative embodiment of the method of this invention, the continuous pilot portion of the strip is pierced or lanced through the pilot portion only, forming spaced generally rectangular pilot portions, and a continuous portion on opposed sides of the pilot portion, thereby forming integral carrier portions.

The method of this invention then includes deforming the corners of the end portion of the rectangular pilot portions outwardly and simultaneously deforming a top end portion of the pilot portion into a generally cylindrical form. In a preferred embodiment, the generally cylindrical end portion is rolled by a die wheel having generally cylindrical recesses in a continuous operation. In the disclosed embodiment of the method of forming self-attaching female fastener elements of this invention, the corners of the pilot portion are deformed generally radially, forming four integral wing-shaped portions which are deformed against the flange portions. The wing-shaped portions may then be either trimmed or removed, leaving a generally cylindrical pilot portion, or the wing-shaped portions may remain with the pilot portion forming additional anti-rotation means following installation of the fastener element in a panel.

The method of this invention further includes piercing an opening through the pilot portions, which forms the bore of the female fastener elements. The opening may be piercing through the pilot portions of the female fastener elements either while the fastener elements remain in a strip or following severing of the strip into discrete fastener elements. The final step is tapping the bore, forming a threaded bore, if desired for the application. In the embodiment of the method of forming self-attaching female fastener elements of this invention, wherein only the pilot portion is lanced and the fastener elements remain in a strip, as described above, one preferred method includes spreading the fastener elements in the strip. In this disclosed embodiment, the female fastener elements are spread in the strip by rolling and thinning the flange portions, forming integral carrier portions and eliminating a straightening operation as disclosed in the above-referenced U.S. Pat. Nos. 3,775,791 and 3,999,659. Where the female fastener elements are chopped from the strip, forming discrete fastener elements as described above, the fastener elements may be reconnected by frangible connector elements, such as wires, as disclosed in U.S. Pat. No. 3,845,860, also assigned to the predecessor in interest of the assignee of this application.

One embodiment of the female fastener elements formed by the method of this invention includes a rectangular body portion including a central projecting pilot portion having an end face and flange portions on opposed sides of the pilot portion, which may be formed by the rolling method described above, wherein the pilot portions include a generally cylindrical end portion and integral wing-shaped portions as described above. The wing-shaped portions provide additional support for the panel, following installation, and further anti-rotation means.

As will now be understood, the method of forming self-attaching female fastener elements of this invention thus combines the advantages of the rolling process of forming female fastener elements known in the prior art, but includes a generally cylindrical pilot portion formed by cold forming or cold heading techniques. Other advantages and meritorious features of the method of forming self-attaching female fastener elements and the improved female fastener elements of this invention will be more fully understood from the following description of the preferred embodiments, the appended claims and the drawings, a brief description of which follows.

BRIEF DESCRIPTION OF THE DRAWINGS

FIG. 1 are end views of a strip illustrating steps in the rolling of a nut section;

FIG. 2 are top views of one method of forming the self-attaching female fastener elements of this invention from the rolled nut section of FIG. 1;

FIG. 3 illustrates the initial steps of an alternative method of forming the self-attaching female fastener elements of this invention;

FIG. 4 is a side partially cross-sectioned view of FIG. 3 in the direction of view arrows 4-4;

FIG. 8 is side view of a further step in the alternative method of forming self-attaching female fastener elements of this invention shown in FIGS. 3 and 4;

FIG. 9 is an end cross-sectional view of FIG. 8 in the direction of view arrows 9-9;

FIG. 10 is a top view illustrating a further step in the alternative method of forming the self-attaching female fastener elements of this invention;

FIG. 11 is an end cross-sectional view of FIG. 10 in the direction of view arrows 11-11;

FIG. 12 is a top view of a further step in the alternative method of forming the self-attaching female fastener elements of this invention;

FIG. 13 is an end cross-sectional view of FIG. 12 in the direction of view arrows 13-13;

FIG. 14 is an end cross-sectional view of FIG. 12 in the direction of view arrows 14-14;

FIG. 15 is a top perspective view illustrating the alternative method of forming the self-attaching female fastener elements of this invention illustrated in FIGS. 3 to 14; and FIG. 16 is a side cross-sectional view illustrating the method of attaching the female fastener elements formed by the method of FIGS. 3 to 15 in a panel.

DESCRIPTION OF THE PREFERRED EMBODIMENTS

Figure 5:
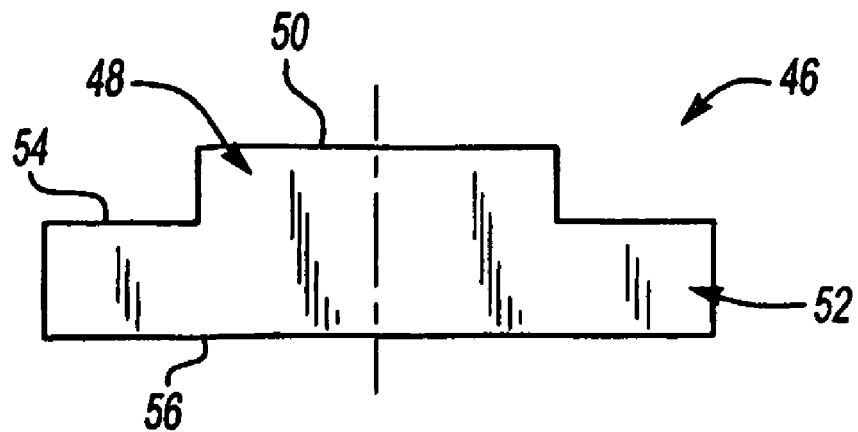
FIG. 5 is an end view of FIG. 3 in the direction of view arrows 5-5.
Figure 6:
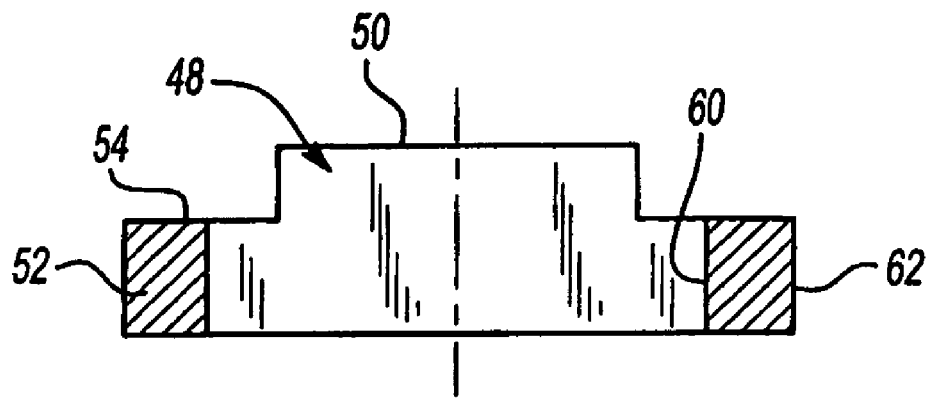
FIG. 6 is an end cross-sectional view of FIG. 3 in the direction of view arrows 6-6.
Figure 7:
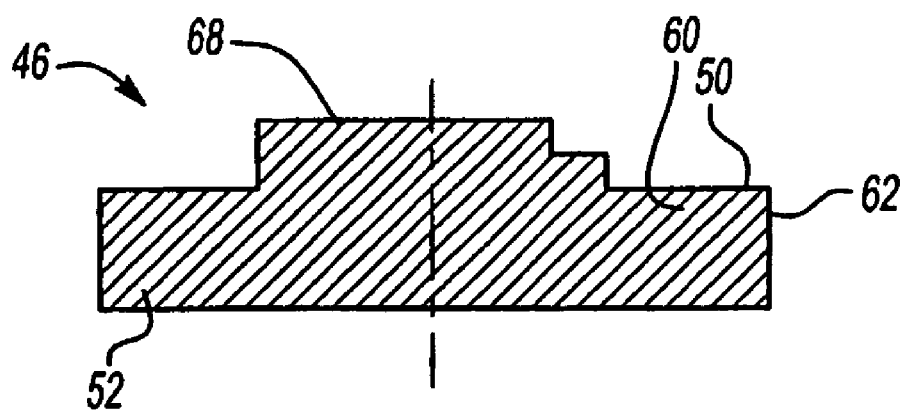
FIG. 7 is an end cross-sectional view of FIG. 3 in the direction of view arrows 7-7.

FIGS. 1 and 2 illustrate one method of forming the self-attaching female fastener elements of this invention combining the advantages of rolling and cold forming techniques. As shown in FIG. 1, the rolling process may begin with round steel bar stock 20, which is initially flattened as shown at 22 with end rollers (not shown), then squared by rollers (not shown) as shown at 24 with side rollers (not shown) and finally rolled into the nut section 26 shown at the right of FIG. 1. In this embodiment, the nut section 26 includes a continuous pilot portion 28 having a planar top face 30, continuous flange portions 32 on opposed sides of the pilot portion 28, "reentrant" grooves 34 in the flange portions 32 on opposed sides of the pilot portion 28 and a planar back face 36 shown in FIG. 1. The term "reentrant" grooves refers to the fact that the side walls of the groove 34 are relatively inclined inwardly as disclosed for example in U.S. Pat. No. 3,648,747, assigned to the assignee of the predecessor in interest of this application, to improve retention of the nut following installation in a panel. However, the configuration of the nut section will depend upon the application of the self-attaching female fastener element and may include, for example, grooves in the side faces of the pilot portion as disclosed, for example, in U.S. Pat. No. 3,187,796 also assigned to the predecessor in interest of the Assignee of this application.

The nut section may ten be chopped or severed from the nut strip 26 as shown at 26a in FIG. 2, thereby forming discrete nut sections each having a rectangular pilot portion 28, including a rectangular end face 30 and rectangular flange portions 32 on opposed sides of the pilot portion 28 as shown. As described above, the method of forming self-attaching female fastener elements of this invention as thus far described is presently utilized by the applicant to form pierce and clinch nuts. However, because the nut section 26a is rolled in a conventional, rolling mill, the pilot portion 28 and the flange portions 32 must be rectangular following cut-off as shown at 26a at the left in FIG. 2. The remaining steps in FIG. 2 are formed by cold forming techniques, as now described.

The first cold forming step is to deform the end portion or end face 30 of the rectangular pilot portion radially outwardly to form a cylindrical end portion 38 as shown in FIG. 2. In this embodiment, the corners of the rectangular end face 30 of the flange portion 28 are deformed radially outwardly, forming four integral wing-shaped portions 40 spaced below the plane of the cylindrical end portion 38 as shown at 26b in the second view of FIG. 2. As described further below in regard to the second embodiment of the method of this invention, the cylindrical end portion 38 and integral wing-shaped portions 40 may be formed by a cold form die member having a cylindrical end cavity and four side cavities having the inverse configuration of the wing-shaped portions 40 or a wheel having spaced die cavities as described below in regard to the alternative method of this invention described in regard to FIGS. 3 and 4, below. The next step in the method of this invention is to pierce an opening or bore 42 through the cylindrical end face 38 and through the nut blank by a conventional piercing tool as shown at 26c in the third step of FIG. 2. The next step in the method of forming self-attaching fasteners of this invention shown in FIG. 2 is to trim off the wing-shaped portions 40 forming a generally cylindrical pilot portion shown at 26d in the fourth step of FIG. 2. The trimming operation may be formed by a conventional die member having a cylindrical internal surface, thereby forming a generally cylindrical pilot portion 38 as shown. The female fastener element may then be utilized as shown for installation to a panel in a die press in a conventional manner, wherein the cylindrical pilot portion 38 pierces a cylindrical opening in a panel (not shown) and is installed in the panel as described in the above-referenced U.S. patents. That is, panel metal is deformed into the reentrant grooves 34 by a conventional die member or die button as described in the above-referenced patents. A thread-forming or thread rolling bolt or screw may then be utilized to attach a second component to the panel (not shown) as known in the art. Alternatively, the cylindrical bore 42 may be tapped, forming a female threaded bore 44 as shown at 26e by the final step of FIG. 2. The method of performing self-attaching female fastener elements of FIGS. 1 and 2 thus combines the advantages of a conventional rolling process forming the nut blanks 26 followed by cold forming as shown in FIG. 2, forming a cylindrical pilot portion 38, thereby eliminating stress risers at the sharp corners of the panel opening formed during installation of a conventional rolled pierce nut fastener in a panel.

FIGS. 3 to 15 illustrate an alternative embodiment of the method of this invention, wherein the self-attaching female fastener elements are retained in an integral strip for installation as described below. FIGS. 3 and 4 illustrate the initial rolling of the strip 46 which, as also shown in FIG. 5, includes a central rectangular pilot portion 48 having a planar end face 50, flange portions 52 on opposed sides of the pilot portion 48, each having a planar end face 54 which, in the enclosed embodiment, is spaced below the planar end face 50 of the pilot portion and the strip further includes a planar back face 56 as shown in FIGS. 4 and 5. As will be understood, the rolled section 46 includes a continuous pilot portion 48 and continuous flange portions 52 on opposed sides of the pilot portion. The cross-sectional shape of the strip 46 will, however, depend upon the desired cross-sectional shape of the self-attaching female fastener elements as described further below.

The first cold forming step in forming the female fastener elements from the strip 46 is to pierce or lance openings 58 through the pilot portion 48 of the strip. As best shown in FIG. 3, the lanced openings 58 extend through the pilot portion 48 and partially through the flange portions 52. In the disclosed embodiment, the lanced openings 58 are generally rectangular each having a side wall 60 spaced from the lateral side wall 62 of the strip. The lancing of the strip thus separates the continuous pilot portion into discrete rectangular pilot portions 48 each having a rectangular end face 50. However, the flange portions 52 are partially severed, as shown. The next step is to deform the rectangular pilot portions to form a generally cylindrical end portion. The cylindrical end portions 68 of the pilot portions 48 are deformed by a die wheel 64 having a plurality of spaced cylindrical die cavities 66, each cavity having the desired shape of the cylindrical end portion 68 of the pilot portion 48 in a continuous operation. In this embodiment, the corners of the end face 50 of the pilot portion are deformed into a cylindrical shape, forming a cylindrical end portion 68 and generally radial wing-shaped portions 70 as described above, except that the strip remains integral.

The next step in the method disclosed in FIGS. 3 to 15 is spacing the cylindrical pilot portions 68 and reducing the thickness of the carrier portion as best disclosed in FIGS. 8 and 15. As shown in FIG. 8, this may be accomplished by a roller 72 which rolls against the flange portions 52, reducing the thickness of the flange portions on opposed sides of the lanced openings 58, thereby reducing the thickness of the flange portions 52 adjacent the outer lateral edges, and forming integral frangible carrier portions 76 as best shown in FIG. 15. The roller wheel 72 includes opposed rim portions 73 which engage the flange portions 52 and equally circumferentially spaced pockets of concave die cavities 74 which receive the pilot portions 48 during rolling of the flange portions. As discussed further below, the integral frangible carrier portions 76 are severed during installation of the fastener elements in a panel.

The next step in this alternative disclosed method of this invention includes rolling grooves 78 into the opposed sides of the pilot portion as shown in FIGS. 10 and 11. In the disclosed embodiment, the lateral grooves are formed in the opposed sides of the pilot portion by rollers 80. The pilot portion is then pierced, forming a cylindrical bore 82 as shown in FIGS. 12 and 13. Finally, the bore may be tapped or internally threaded as shown at 84 in FIGS. 12 and 14 using conventional tappers or gang tappers.

The self-attaching female fastener elements may then be installed in a panel by conventional means as shown, for example in FIG. 16. The panel 86 is supported on a die button 88 having a bore 90 and the fastener element 92 is driven into the panel by a reciprocating plunger 94 in an installation head (not shown). An opening may be preformed in the panel and the panel is then deformed radially inwardly into the lateral groove 78, retaining the fastener element 92 on the panel. The radial portions 70 provide additional anti-rotation means, preventing rotation of the self-attaching fastener element 92 in the panel 86, following installation. As described in the above-referenced U.S. Pat. Nos. 3,775,795 and 3,999,659, the carrier portion 76 is severed in the installation head during installation forming staked discrete self-attaching female fastener elements in the plunger passage of a pierce nut installation head or the fasteners may be severed from the strip seriatim by the plunger.

As will be understood by those skilled in this art, various modifications may be made to the self-attaching female fastener elements and method of forming such elements of this invention within the purview of the appended claims. For example, the integral wing-shaped portions 40 of the female fastener element illustrated in FIG. 2 may be retained on the pilot portion providing additional resistance to rotation of the fastener element in the panel, following installation. Further, the flange portions 52 of the female fastener elements formed by the method disclosed in FIGS. 3 to 15 may include a reentrant groove or grooves, such as the grooves 34 shown in FIG. 1. Further, the wing-shaped portions 70 may be severed from the pilot portion during forming of the female fastener elements, as shown in FIG. 2. As described above, the bore 42 in FIG. 2 and 82 in FIG. 12 may remain unthreaded for receipt of a self-tapping or thread rolling screw or bolt. As will be understood, however, the methods of forming self-attaching female fastener elements of this invention combines the advantages of the rolling processes presently used by the applicant to form rectangular self-attaching female fastener elements as described in the above-referenced patents with the advantage of a female fastener element formed by cold forming methods providing a generally cylindrical pilot portion, which is an object of this invention. Having described preferred embodiments of self-attaching female fastener elements and methods of forming same, the invention is now claimed, as follows.

The invention claimed is:

1. A method of forming self-attaching female fastener elements comprising the following steps:
   rolling a continuous metal strip including a continuous central pilot portion, said continuous pilot portion including a top portion having generally parallel sides, said continuous metal strip further including continuous flange portions on opposed sides of said continuous pilot portion;
   severing at least said continuous pilot portion and forming spaced rectangular pilot portions;
   deforming corners of said rectangular pilot portions to simultaneously form four radial integral wing-shaped portions and a generally cylindrical end portion; and
   piercing an opening through each of said rectangular pilot portions, said openings extending through said generally cylindrical end portions.

2. The method of forming self-attaching female fastener elements as defined in claim 1, wherein said method includes severing said continuous flange portions and separating said strip into discrete segments before deforming said corners of said rectangular pilot portions, each segment having one of said rectangular pilot portions and flange portions on opposed sides of said rectangular pilot portions.

3. The method of forming self-attaching female fastener elements as defined in claim 1, wherein said method includes rolling said continuous metal strip and forming integral carrier portions on opposed sides of said rectangular pilot portions, severing said continuous flange portions without severing said carrier portions and permanently stretching said carrier portions, thereby spacing said rectangular pilot portions.

4. The method of forming self-attaching female fastener elements as defined in claim 3, wherein said method includes stretching said carrier portions by rolling said continuous flange portions, thereby forming said carrier portions having a thickness less than said flange portions and spreading said rectangular pilot portions.

5. A method of forming self-attaching female fastener elements comprising the following steps:
   rolling a continuous metal strip including a continuous central pilot portion, said continuous central pilot portion including a top portion having generally parallel sides, said continuous metal strip further including continuous flange portions on opposed sides of said continuous pilot portion;
   severing at least said continuous pilot portion and forming spaced rectangular pilot portions;
   deforming corners of said rectangular pilot portions radially outwardly and simultaneously deforming top portions of said rectangular pilot portions into a cylindrical form; and
   piercing an opening through each of said rectangular pilot portions, said openings extending through said top portions of said rectangular pilot portions; and
   wherein deforming said corners of said rectangular pilot portions radially outwardly includes forming four radial integral wing-shaped portions and simultaneously forming a generally cylindrical end portion.

6. The method of forming self-attaching female fastener elements as defined in claim 5, wherein said method includes trimming off said four radial integral wing-shaped portions, thereby forming a generally cylindrical pilot portion.

7. The method of forming self attaching female fastener elements as defined in claim 5, wherein said method includes piercing said openings through said rectangular pilot portions after forming said four radial integral wing-shaped portions.

8. A method of forming self-attaching female fastener elements comprising the following steps:
   rolling a continuous metal strip including a continuous projecting central pilot portion having parallel side faces and continuous flange portions on opposed sides of said continuous pilot portion and said continuous pilot portion having an end portion projecting beyond a plane of said flange portions;
   severing and spreading at least said continuous pilot portion and spreading said flange portions thereby forming spaced rectangular female fastener elements each including a rectangular pilot portion and a rectangular end portion spaced above said plane of said flange portions;
   deforming corners of said end portions of said rectangular pilot portions radially outwardly and deforming said end portions into a cylindrical shape; and
   piercing an opening through said pilot portion through said end portions.

9. The method of forming self attaching fastening elements as defined in claim 8, wherein said method includes severing said continuous metal strip, thereby forming discrete fastener elements prior to deforming said corners of said rectangular pilot portions.

10. The method of forming self-attaching female fastener elements as defined in claim 8, wherein said method includes:
    severing said continuous pilot portion without severing continuous carrier portions; and
    rolling said cater portions, thereby spacing said pilot portions.

11. The method of forming self-attaching female fastener elements as defined in claim 10, wherein said method includes thinning said carrier portions.

12. The method of forming self-attaching female fastener elements as defined in claim 8, wherein said method includes deforming said corners of said end portions of said rectangular pilot portions radially outwardly and forming four radial integral wing-shaped portions.

13. The method of forming self attaching female fastener elements as defined in claim 12, wherein said method includes trimming off said four radial wing-shaped portions.

* * * * *